Patented Oct. 10, 1922.

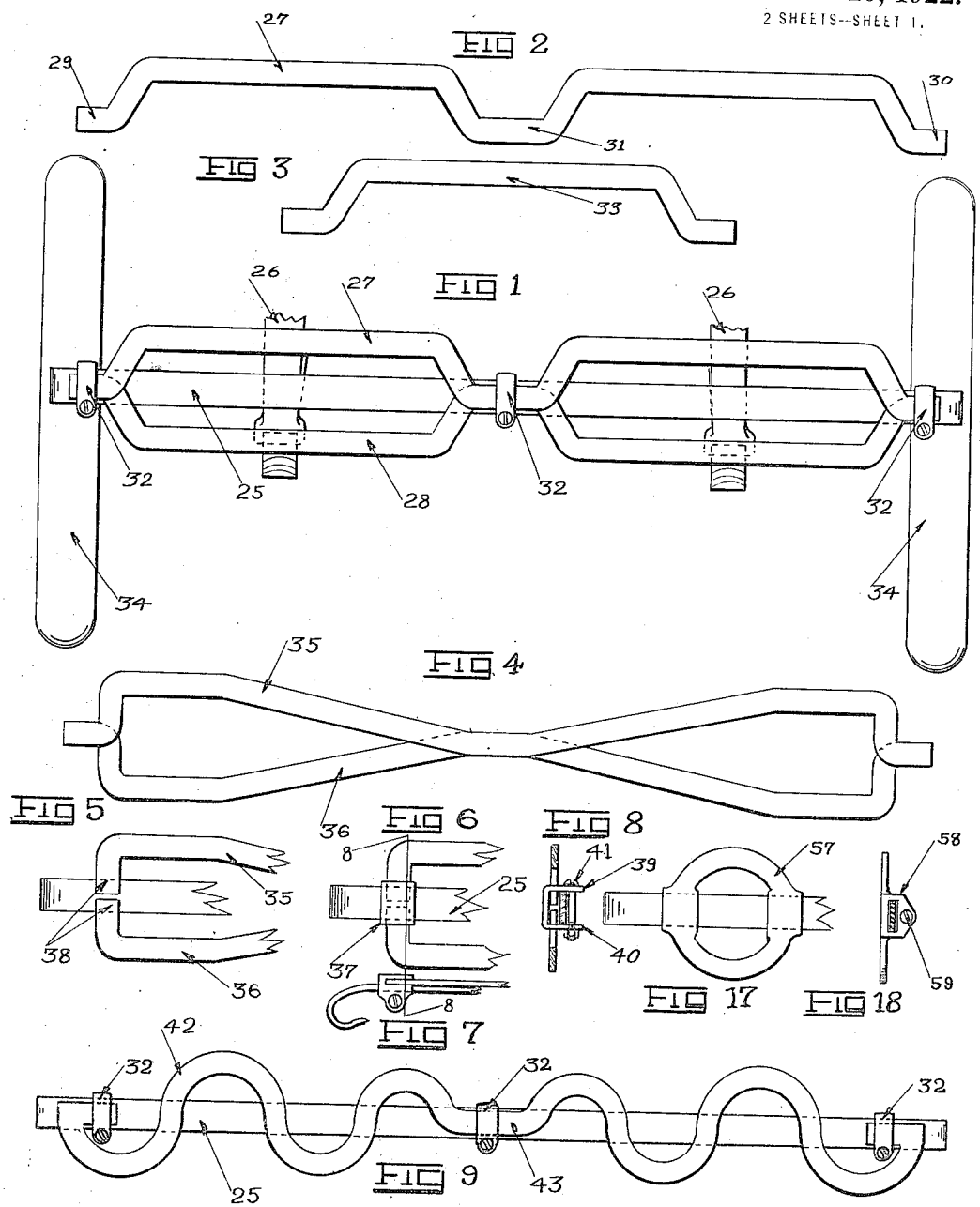

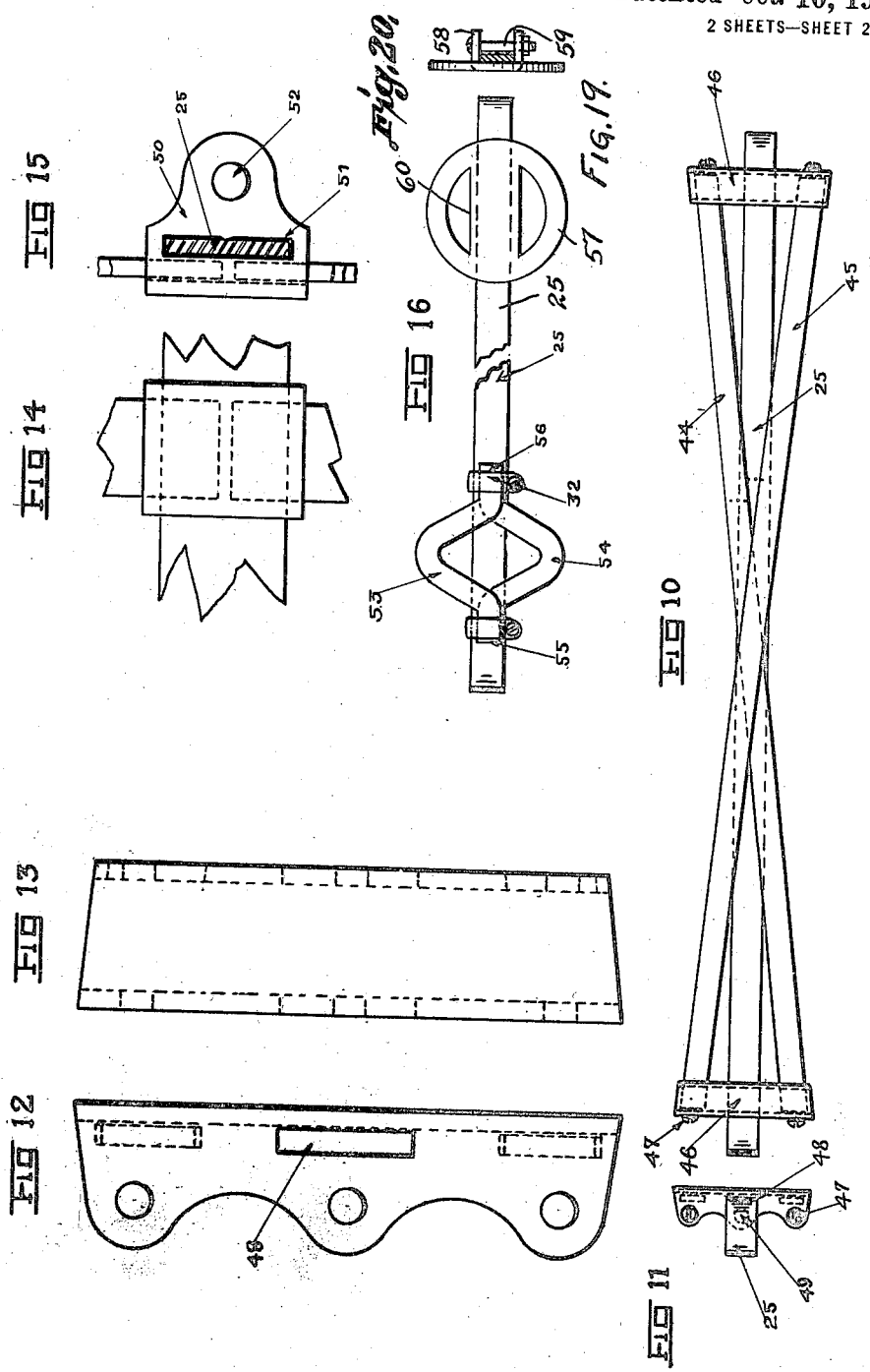

1,431,264

UNITED STATES PATENT OFFICE.

SAMUEL H. SHAW, OF NEW YORK, N. Y.

AUTOMOBILE BUMPER.

Application filed February 28, 1921. Serial No. 448,508.

*To all whom it may concern:*

Be it known that I, SAMUEL H. SHAW, a citizen of the United States of America, residing in the city of New York, county of New York, and State of New York, have invented certain new and useful Improvements in Automobile Bumpers, of which the following is a specification.

My invention relates to automobile bumpers, and particularly to the impact member of a bumper.

The bumpers in general use today, whether of the resilient or rigid impact member type are commonly of very slight vertical extent—say from 2¼ to 2½ inches. While a bumper of this type protects as well as possible against a vertical obstruction, such as a post or pole, it is of little value as protection against a horizontal obstruction which does not lie in the plane of the impact element of the bumper. For example, in street traffic, where 80% of all collisions occurs, unless the bumpers of two colliding cars are in the same horizontal plane, practically no protection against injury to fenders and lamps is afforded thereby. Since these bumpers are ordinarily mounted on the chassis side bars, and the latter are at different heights from the ground, not only owing to different constructions of the chassis, but to different wheel diameters, it is seldom the case that the bumpers of two cars register. To meet this difficulty I now provide an impact member attachment which may be readily mounted on the usual bumper and will serve to increase the vertical range of the impact member of the bumper. Just what shape may be given to this attachment, or the particular fastening means for securing the attachment to the bumper, are subsidiary details of the invention—my underlying thought being to provide an attachment mountable on a standard bumper, and having the effect of increasing the vertical range of its impact member.

A second feature of my invention resides in the location of its increased impact area. Certain bumpers have recently appeared upon the market which afford an impact area of greater vertical extent in the mid-portion of the bumper. While this is effective in case of a head-on collision, it is of practically no value where the collision takes place with the vehicles at a material angle to each other, such as occurs when a car is driven out from the curb. A large percentage of accidents to fenders and lamps occurs under just these conditions, and the bumper above mentioned, with increased impact extent in its mid-area, does not take care of this condition. My thought is to provide the impact member of the bumper with an increased vertical range at its end—that is to say outboard of the chassis side bars, and in the vicinity of the fenders and lamps. Such protection may be afforded not only by an attachment of the type before mentioned, which may be applied to bumpers now on the market, but it also may be incorporated in a bumper during the process of manufacture.

Some of the various possible embodiments of my invention are indicated in the accompanying drawings, in which—

Fig. 1 is a front elevation of a bumper of spring strap type to which my impact attachment is applied;

Fig. 2 is an elevation of one of the bars of the attachment;

Fig. 3 is a similar view of a modified form of bar;

Fig. 4 is a front elevation of a further modified construction of the attachment;

Fig. 5 is a similar view partially broken away showing modified attaching terminals for the bars;

Fig. 6 is a similar view showing an attaching bracket for terminals of the type shown in Fig. 5;

Fig. 7 is a plan thereof;

Fig. 8 is a vertical section on the line 8—8, Fig. 6;

Fig. 9 is an elevation of another modified form of impact bar attachment;

Fig. 10 is a further modification;

Fig. 11 is an end elevation of the latter;

Figs. 12 and 13 are respectively side and front elevations of the attaching bracket of Fig. 10, but drawn to a larger scale;

Figs. 14 and 15 are views similar to Figs. 6 and 8 drawn to a larger scale and showing a modified form of attachment bracket;

Fig. 16 is a front elevation of portion of a bumper showing another type of auxiliary impact member;

Fig. 17 is a similar view of a modification of the same type;

Fig. 18 is a side elevation thereof showing means for securing the attachment to the bumper bar; and Fig. 19 is a front elevation of an impact member of further modified construction applied to the end of a spring strap bumper; and Fig. 20 is a side elevation thereof, showing the bumper proper in section.

While the impact attachment member may be applied to bumpers of the rigid impact bar type, the attaching brackets being suitably modified for this purpose, I have shown the invention applied to bumper bars of the spring strap type, since the latter are more common. The bumper 25 of this type is indicated in Fig. 1, the ends of the bumper being carried back as usual and secured, in a manner not indicated, to the chassis side bars 26. As will be noted, the vertical range of the impact member is obviously quite limited. It is increased practically five times by the addition thereto of the impact bars 27 and 28 illustrated. Each of these bars has a shape shown in Fig. 2, the ends 29 and 30 lying in register with an intermediate offset bridge 31, the ends and bridge lying in front of the impact member 25 of the bumper in adjusted position, and being secured thereto by stirrup clamps 32. The second bar 28 corresponds to the bar 27, being merely reversed in position, and its end and mid-bridge portions registering with those of the bar 27, it being gripped and secured to the bumper 25 by the same clamps 32.

Instead of having the bars extend all the way across the bumper front, as in Fig. 2, a pair of shorter bars 33 of the type shown in Fig. 3 may be used on each side of the bumper, the adjacent ends of the bars being held in position by the mid-clamp 32.

In either case, it will be noted that the increased vertical range of the impact member of the bumper extends well outboard of the chassis side bars and practically to the end of the bumper bar 25 which lies in front of the wheels 34. The added protection afforded by a construction such as this has been pointed out above.

As has been indicated, the greatest danger from collision occurs when the cars are at a considerable angle to each other, and it is therefore not necessary often to provide a mid-impact area of increased vertical range, and I have shown in Fig. 4 a modified construction in which the upper and lower bars 35 and 36 are spaced farthest apart at their opposite ends, and inclined toward their mid-area where they are to be secured by the clamps 32, as before cited. In other respects this construction is identical with that above described.

In Fig. 5 I have indicated the ends of the bars 35 and 36 approaching each other vertically rather than being offset to overlie each other horizontally.

Figs. 6 to 8 indicate a bracket 37 in which these ends 38 of the bars 35 and 36 may be received. The bracket is of the yoke type, with upper and lower webs 39 and 40 straddling the bumper bar 25 and being united at the rear of the latter by a clamping bolt 41.

Fig. 9 shows still another modification, in which the bar attachment 42 is sinuous, but is provided intermediate its opposite ends with a straight reach 43 to receive the clamp 32.

In Fig. 10 a still simpler form of construction is used in which the impact member attachment comprises a pair of straight bars 44 and 45, the opposite ends of which take into pressed steel brackets 46, to which they are clamped by pinch bolts 47. The sides of the bracket are slotted at 48 to receive the bumper 25, and held in position on the bumper by a pinch bolt 49.

In Figs. 14 and 15 I have indicated a somewhat similar arrangement for securing the ends of the bars of a construction such as shown in Fig. 5. As will be noted, the bracket 50 is slotted at 51 to receive the bumper 25, and is held in position by a pinch bolt 52 passing through the sides of the clamp and drawing it into engagement with the bumper.

For cars of smaller size than those to which the larger attachments are suitable, I provide the attachments shown in Figs. 16, 17, 18 and 19. To give substantially equal protection with much less weight and expense, I may provide an impact attachment of the type shown in Fig. 16, comprising a pair of more or less V-shaped bars 53 and 54 with offset ends 55 and 56 lying in register with the bumper 25 and secured thereto by clamps 32. These bars may be arranged in any position along the length of the impact member of the bumper that may be desired, but preferably, as I have before indicated, at a point in line with or outboard of the chassis side bars.

Instead of using two bars such as 53 and 54, I may substitute a disc-like or ring-like member 57 struck from sheet steel, and having at its opposite sides rearwardly extending flanges 58 which straddle the bumper bar and are pierced by a bolt 59 to clamp the disc in position. Such a disc may be made very light, and yet have sufficient strength to meet the requirements of the bumper. As many of the discs as may be desired may be arranged along the length of the impact member of the bumper, but my experience is that one at each end gives ample protection, supplemented perhaps by another disc at the mid-area of the bumper.

The attachments shown in Figs. 16, 17 and 19 are in the nature of auxiliary members to be applied to the impact member of a standard bumper. Fig. 19 shows the impact member 57 having D-shaped openings punched through on the curved sides and turned back along the straight edge 60 to form the clip or rearwardly extending flanges 58 to straddle the bumper in the horizontal plane instead of vertical and secured to bumper bar 25 by means of pinch bolt 59. The same idea may be embodied, however, in the bumper when made.

From the foregoing it will be clear that my invention is susceptible of embodiment in various forms of construction, and is not limited to any of the details shown or described, which are merely illustrative embodiments of what I claim as my invention.

I claim—

1. An automobile bumper attachment comprising a sheet metal auxiliary impact member of greater vertical range than the impact member of the bumper, and having integral securing flanges offset substantially at right angles thereto to engage the impact member of the bumper, together with clamping bolts engaging said flanges to clamp the same upon the bumper.

2. An automobile bumper attachment comprising a sheet metal auxiliary impact member of greater vertical range than the impact member of the bumper, and having integral securing flanges offset substantially at right angles thereto and passing across the upper and lower edges of the bumper to a point behind the latter, together with clamping bolts engaging the overhanging ends of said flanges to clamp the latter upon the bumper.

3. An automobile bumper attachment comprising a sheet metal auxiliary impact member of greater vertical range than the impact member of the bumper, and having integral flanges struck from the body of said unit and offset therefrom to engage the bumper, and means for securing said flanges to the bumper.

4. An automobile bumper attachment comprising a sheet metal auxiliary impact member of greater vertical range than the impact member of the bumper, and having integral flanges struck from the body of said unit and offset therefrom to embrace and extend beyond the bumper, and means engaging the extended ends of said flanges to clamp said auxiliary impact unit on the bumper.

5. An automobile bumper having at spaced points impact areas of greater vertical range than the intervening portions of the bumper, said impact areas having the general contour of an annulus.

6. An automobile bumper having at spaced points impact areas of greater vertical range than the intervening portions of the bumper, said impact areas having the general contour of an annulus, and being apertured within the area defined by its periphery.

7. An attachment for automobile bumpers comprising an impact disc adapted to be mounted on the impact member of a bumper to increase the vertical range of the latter.

8. An attachment for automobile bumpers comprising an impact disc adapted to be adjustably mounted on the impact member of a bumper to increase the vertical range of the latter.

In testimony whereof I have signed my name to this specification.

SAMUEL H. SHAW